United States Patent [19]

Aimar

[11] 4,059,938
[45] Nov. 29, 1977

[54] ADJUSTABLE MOLDING END CAP

[75] Inventor: Michele Aimar, Turin, Italy

[73] Assignee: ITW Fastex Italia, S.p.A., Turin, Italy

[21] Appl. No.: 721,151

[22] Filed: Sept. 10, 1976

[30] Foreign Application Priority Data

Sept. 11, 1975 Italy .................................. 27134/75

[51] Int. Cl.$^2$ .............................................. E04C 2/38
[52] U.S. Cl. ........................................ 52/716; 52/718; 85/5 R; 293/1
[58] Field of Search ......................... 52/716, 717, 718; 49/460, 462; 293/1, 62, 70, 71 R; 156/211, 258; 428/99, 31, 458; 242/74, 75; 222/129.1; 249/204

[56] References Cited

U.S. PATENT DOCUMENTS

| | | | |
|---|---|---|---|
| 3,353,321 | 11/1967 | Heilweil et al. | 52/716 X |
| 3,451,169 | 6/1969 | Arnold et al. | 52/716 X |
| 3,606,432 | 9/1971 | Honatzis | 52/716 X |
| 3,715,138 | 2/1973 | Finkle | 293/1 |
| 3,831,990 | 8/1974 | Singh | 52/716 X |
| 3,843,475 | 10/1974 | Kent | 52/716 X |
| 3,914,482 | 10/1975 | Sawa | 52/716 X |
| 3,938,842 | 2/1976 | Ruhl | 52/716 X |
| 3,940,901 | 3/1976 | Nivet | 52/717 |
| 3,959,538 | 5/1976 | Loew | 52/716 X |

*Primary Examiner*—Price C. Faw, Jr.
*Assistant Examiner*—Robert C. Farber
*Attorney, Agent, or Firm*—Joeb R. Halvorsen; Robert W. Beart

[57] ABSTRACT

An adjustable end cap for moldings formed of an element of a plastic material comprising a first portion intended to be inserted in a molding end and a second portion forming an abutment with said first portion and intended to project from the molding end. The first portion has a member for anchoring the plastic element in a hole provided in a wall to which said molding is to be applied and between said member and said second portion of the plastic element an yieldable section is provided which permits relative movements between said anchoring member and said second portion.

3 Claims, 6 Drawing Figures

ADJUSTABLE MOLDING END CAP

This invention relates to moldings of the type employed for ornamental purposes on car bodies, electrical appliances and the like, and more particularly to an end cap for such moldings.

It is known that the moldings which are applied in the form of strips to car bodies, electrical appliances and other must be closed at the ends by an end cap both for aesthetical reasons and for avoiding a penetration of dirt inside the molding. This end cap is generally comprised of a grommet of rubber or plastic material which is inserted in the end of the molding and locked in the latter by a squeezing operation. In order to permit the introduction of the end cap in the molding the latter must be left free at the ends for a certain length and then the molding is fastened to the car body in a location lying a certain distance from the molding end. Accordingly, this end is free with respect to the car body and, when the car is washed in an automatic washing machine the free end of this molding is "tossed" and eventually torn by the brushes of the washing machine. Furthermore, the free end can be damaged or torn away also in the case of rubbing against another car or a wall.

The object of this invention is to obviate this drawback of known molding end caps.

This problem is solved according to this invention by fastening the end cap, in addition to the molding end, also to the wall to which the molding itself is fastened.

More particularly, the molding end cap according to this invention is formed of an element of a plastic material comprising a first portion intended to be inserted in a molding end and a second portion forming an abutment with said first portion and intended to project from the molding end and is characterized in that said first portion has a member for anchoring the plastic element in a hole provided in a wall to which said molding is to be applied and between said anchoring member and said second portion of the plastic element an yieldable section is provided which permits relative movements between said anchoring member and said second portion of the plastic element.

With this arrangement it is possible perfectly to close at all times the molding by means of the end cap in spite of differences in the location of the anchoring holes provided in the wall to which the molding is to be applied and due to unavoidable working tolerances.

Furthermore, in some cases, especially with moldings having an important length, fastening elements of the molding can be saved in that at the ends the anchoring member of the end caps act them-selves as fastening elements of the molding so that it is unnecessary to arrange other fasteners adjacent the molding ends.

The invention will be more apparent from the following detailed description of an embodiment thereof, given by way of example only and thereof not intended in a limiting sense, in connection with the accompanying drawings, wherein.

Figure 1:
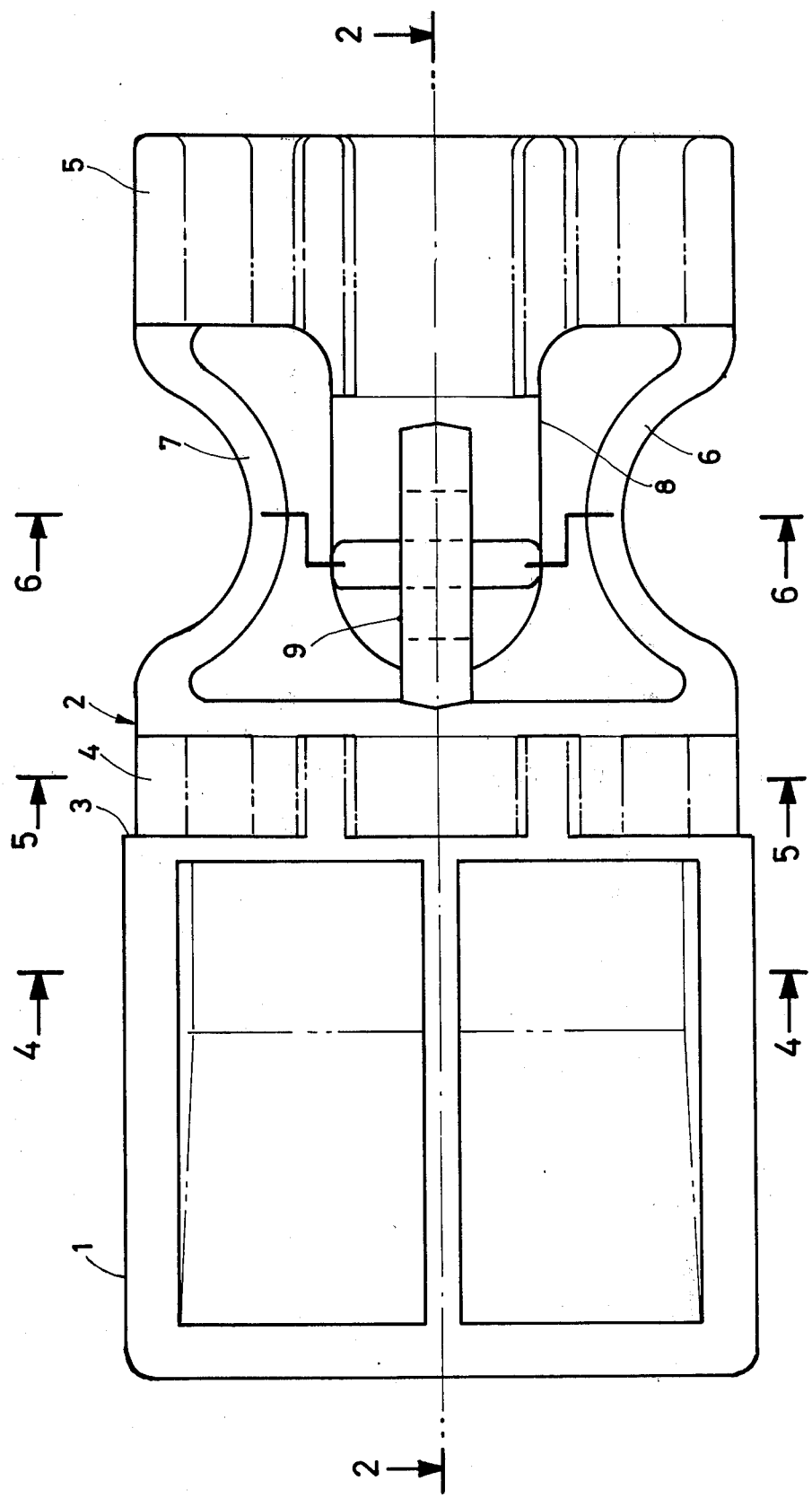
FIG. 1 is a side view of an end cap according to the invention.
Figure 2:
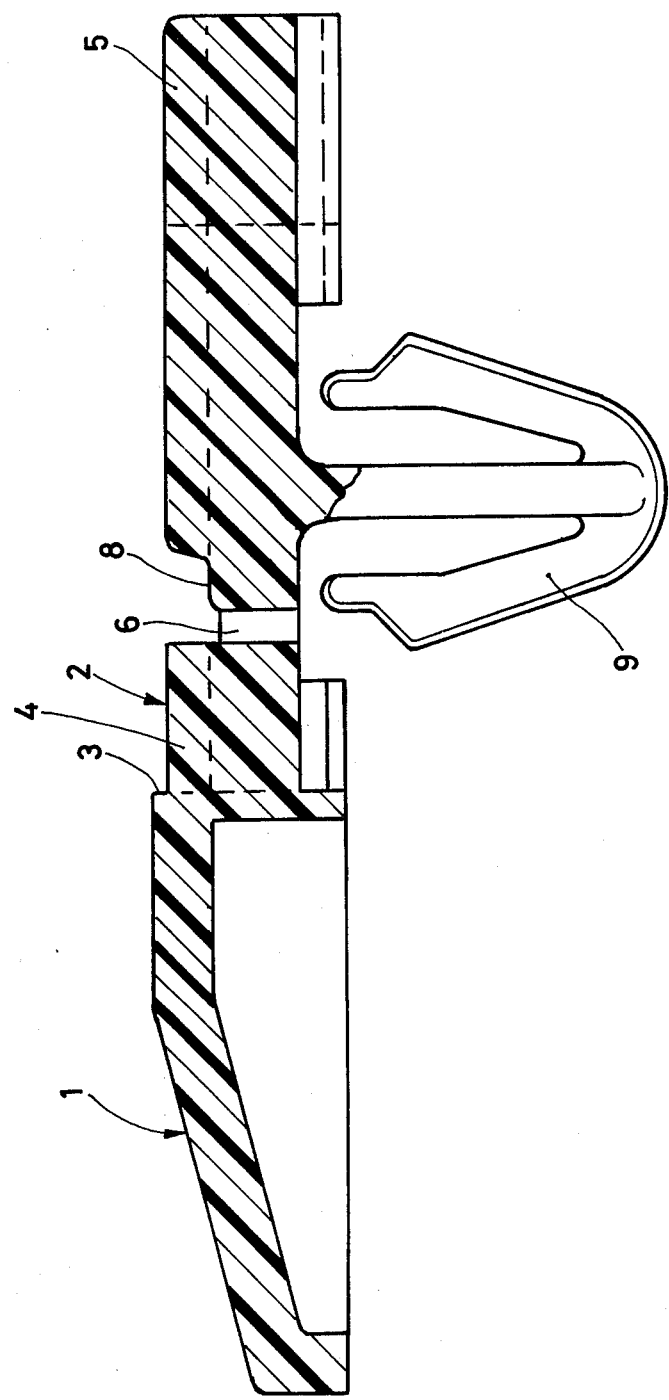
FIG. 2 is a sectional view taken along the line 2—2 of FIG. 1.
Figure 3:
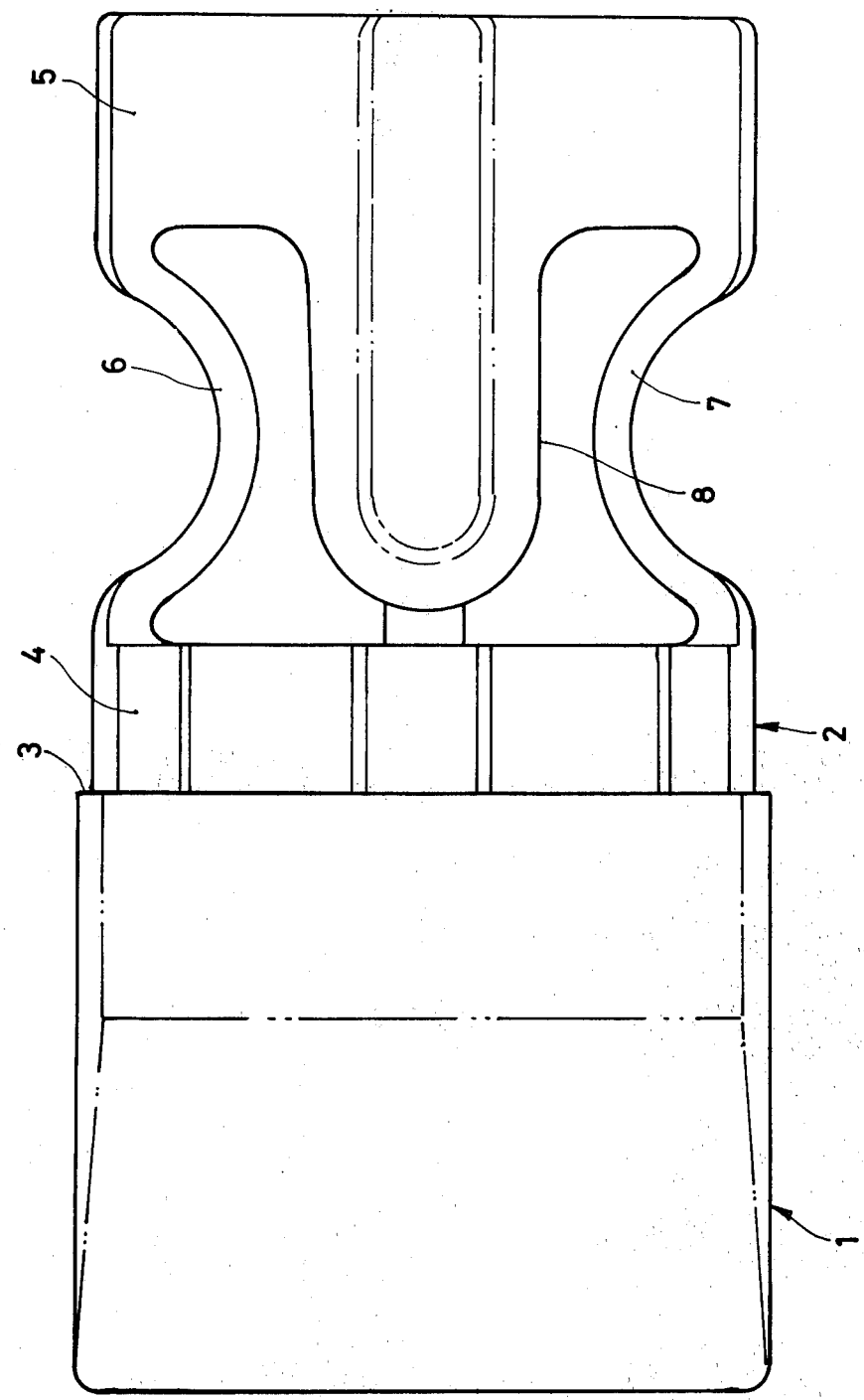
FIG. 3 is a view of the end cap of FIG. 1 looking from the opposite side with respect to FIG. 1.
Figure 4:
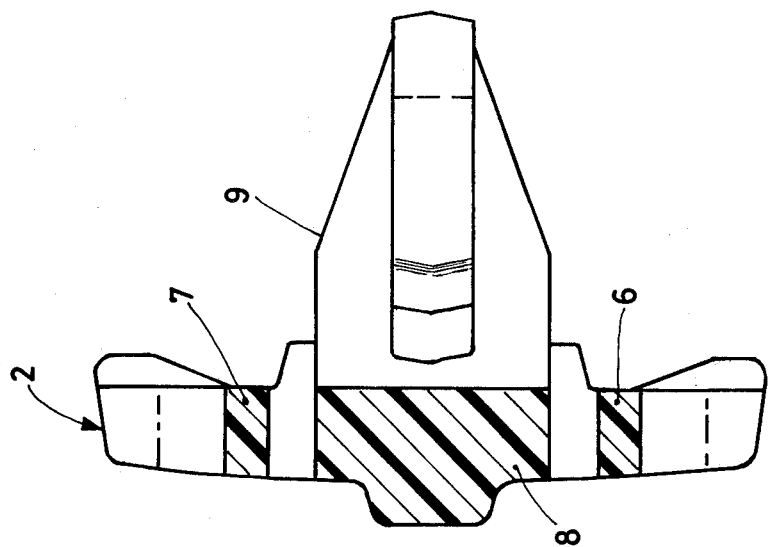
FIG. 4 is a sectional view taken along the line 4—4 of FIG. 1.
Figure 5:
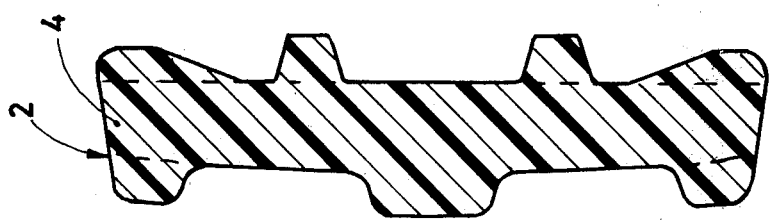
FIG. 5 is a sectional view taken along the line 5—5 of FIG. 1.
Figure 6:
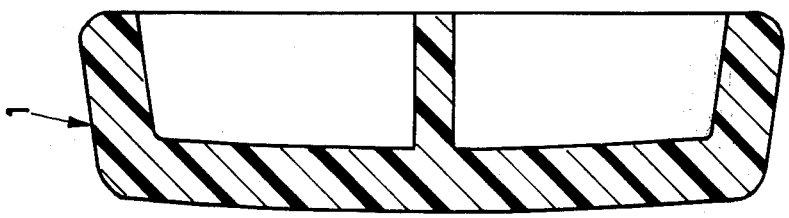
FIG. 6 is a sectional view taken along line 6—6 of FIG. 1.

Referring to the drawings, it is seen that the plastic end cap essentially comprises a first portion 1 which when the end cap is applied, is intended to project from the molding and a second portion 2 intended to be inserted in the molding and forming an abutment 3 with the first portion. The second portion 2 has a pair of end sections 4, 5 connected to each other by a pair of flexible arcuated bridges 6, 7. Projecting from the section 5, in the space between the sections 4 and 5 in an appendix 8 on a side of which an anchoring member 9 is arranged, integrally formed there-with and intended to be anchored in a hole provided in the wall to which the molding is applied, generally the plate of a body of a car.

In order to mount the described element, this is introduced from the side of the portion 2 in the molding already fastened to the relevant wall and then it is slid until the abutment 3 contacts the end portion of the molding. At this point the anchoring member 9 is brought in register with the relevant hole provided in the wall by acting on the section 5 of the member and bringing it more or less near the section 4 by taking advantage of the flexibility of the bridges 6, 7. When the anchoring member 9 is in a position coaxial to the hole, this member is introduced by snap action into the hole and hooked in a known manner to the wall. Thus, with a single operation, the locking of the end cap in the molding and the fastening of the end of the molding to the relevant wall are obtained.

While an embodiment only of the invention has been described it is obvions that various changes and modifications can be made thereto without departing from the scope of the invention.

What I claim is:

1. A one-piece plastic adjustable end cap and retaining means adapted for mounting decorative moldings to an apertured work panel including a first portion retaining means having a substantially rigid head complementary to and adapted to be accepted within said molding in spaced relation to an end of said molding, said first portion further having stud means for anchoring said head in relatively fixed relation to said apertured panel, a second portion moveably spaced relative to said first portion and having molding engaging means for complementary acceptance within the said molding and a decorative end cap integral with and extending from said engaging means, said cap abutting the end of the molding and projecting axially therefrom, and resilient means connecting said two portions whereby relative movement is permitted between said anchored first portion and said second end cap portion.

2. An end cap of the type claimed in claim 1 wherein said resilient connecting means includes two arcuately shaped spring-like members disposed on opposite sides of the longitudinal axis of said cap.

3. An end cap of the type claimed in claim 1 wherein said stud means is positioned intermediate said two portions and rigidly connected to one end of said first portion, said stud means including resilient snap engaging shoulder means for acceptance within said apertured panel, said first and second portions lying substantially in a common place while said stud extends substantially perpendicularly to said plane.

* * * * *